United States Patent [19]

Disbrow

[11] 4,227,211
[45] Oct. 7, 1980

[54] METHOD FOR ANALYZING SEASONAL GROWING CONDITIONS OF CROPS

[75] Inventor: Lynnford E. Disbrow, Kennewick, Wash.

[73] Assignee: Columbia Photografix, Inc., Pasco, Wash.

[21] Appl. No.: 944,702

[22] Filed: Sep. 22, 1978

[51] Int. Cl.² .............................................. H06N 5/18
[52] U.S. Cl. .................... 358/113; 250/340; 358/109; 364/515
[58] Field of Search .................... 358/107, 113, 109; 250/333, 340; 364/515

[56] References Cited

U.S. PATENT DOCUMENTS

| | | | |
|---|---|---|---|
| 3,748,471 | 7/1973 | Ross | 250/333 |
| 3,752,914 | 8/1973 | England | 358/113 |
| 3,752,915 | 8/1973 | Parker | 358/113 |
| 3,978,324 | 8/1976 | Rayner | 358/107 |
| 4,037,048 | 7/1977 | Walker | 358/113 |

*Primary Examiner*—Howard W. Britton
*Attorney, Agent, or Firm*—Wells, St. John & Roberts

[57] ABSTRACT

This method uses electronic measurement of color values in aerial infrared photographic transparencies to analyze the growing condition of a crop. A series of infrared photographs are taken during the growing season, and average color values from the resulting image are plotted and compared to optimum growing conditions. Electronic measurements are made of color densities about the total field area as represented on each photographic image. Each measurement is corrected to eliminate exposure variations in the images due to photographic factors, weather factors, lighting and film conditions, and the date and time at which the photograph was taken.

4 Claims, 3 Drawing Figures

METHOD FOR ANALYZING SEASONAL GROWING CONDITIONS OF CROPS

BACKGROUND OF THE INVENTION

This invention relates to a method for analyzing the seasonal growing conditions of crops by use of infrared aerial photography. Infrared aerial photography has been used to detect the presence and amount of growing crops. Infrared photographs are also useful in the identification of field areas subject to disease or other traumatic conditions. However, the present method carries such analysis into a time related process, by which the growing conditions of a crop can be compared from one day or week to the next with accuracy, and by which conditions in various fields can be compared accurately. Furthermore, the current growing conditions of a crop can be accurately compared to optimum conditions derived experientially from analyses of earlier growing seasons.

The analyses of crop condition is accomplished by using infrared aerial photographs of the total field area and projecting the resulting false color transparencies onto a color averager for reception by a color analyzer. The color values measured by the analyzers are segregated for three colors, (red, blue and green) and are corrected for exposure variations resulting from photographic, weather and time factors. The resulting color values can then be plotted for each field, and compared to plotted values representative of optimum growing conditions.

My first efforts in taking infrared aerial photographs of crops showed to me that there were substantial difficulties involved in normal methods used by me and others in this industry. The primary problem was that one week the slide of the subject field would appear to be one color, and the next week it would appear somewhat different in color, although I was sure that the color shift had not occurred in the field. This difference in the visual color perception of the slides resulted from five basic considerations: (a) each film batch was somewhat different, (b) colors changed depending upon whether the photograph was taken on an overcast day or not, (c) color changed with the time of day and date, (d) slight differences in exposure of the film would change color relationships, (e) color shift problems also were due to processing variations in handling the film.

To overcome the difficulties involved in visually analyzing slides of a field, I have developed a method for using an electronic color analyzer and resulting graph of the color density numbers. To provide continuity from one photograph to the next, I computed a number of corrections relating to the five basic problems related above. These corrections are applied to the analyzer readings prior to charting. The electronic color analyzer has the further ability to detect color shifts below the visual perception level, and provides substantially greater accuracy in the end result as charted.

To check this method, I have kept careful records of flight data, used color standards and other information and have plotted corrected colors from these readings each week during entire growing seasons for various crops. I then checked yield data from the analyzed fields and found that those crops which followed particular color trends through the season produced good harvests and those that deviated from these trends did not. By refining this analysis of color value trends, I have found that I can determine approximate yield of a field, quality of the crop, high or low nitrogen levels, and whole field stresses that were impossible to identify with prior infrared aerial photography techniques. It is important to note that the electronic analysis of these photographs cannot be used except in conjunction with normal visual field inspections and organic chemical crop and soil analysis. When used in this manner, the infrared aerial photography processes and electronic color analyses fill in information that is missing in agronometrical testing methods and previous methods of visual infrared photographic analyses.

Description of the Preferred Embodiment

Figure 1:
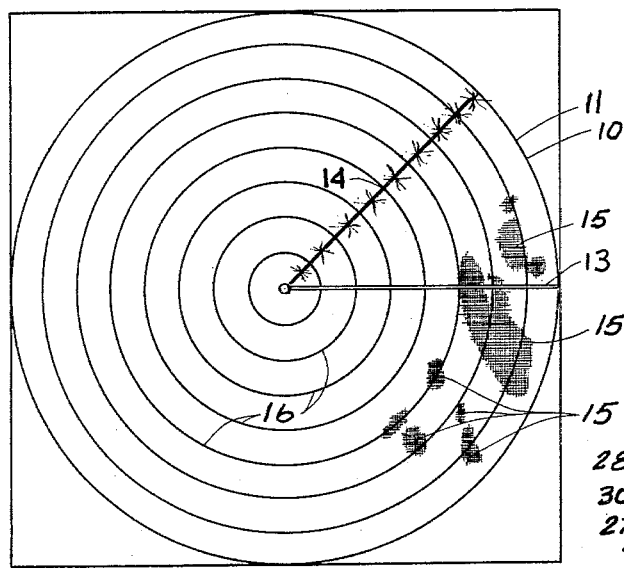
FIG. 1 is an illustration of an aerial photograph used in conjunction with this invention.
Figure 2:
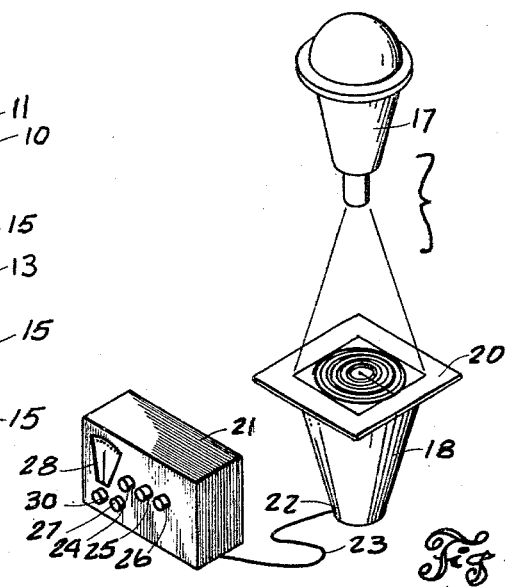
FIG. 2 is a schematic view of the analyzing equipment.

The present method of analyzing the seasonal growing conditions of crops is adapted to row crops that substantially fill the row spacings and remain green during the growing season. This includes potatoes, sugar beets, wheat and other grains, alfalfa (until first cut), beans, peas, rice, soy beans and similar crops. The method is not applicable to crops such as corn, which produce tassles that are not green, alfalfa after it has been cut, grapes and other crops that do not fill the field area, or fruit trees, which require individual analysis for each tree.

Infrared radiation from the sun penetrates the leaf of a growing plant below the surface "green" layer and is reflected by the mesophyll layer. This layer often indicates problems in the growing condition of the plant quicker and to a greater degree than changes in the surface color of the plant. Infrared sensitive film (false color infrared positive transparency film) records infrared reflectants as red color, green reflectants as blue color, and red reflectants as green color. By relating these three colors to one another, the condition of the leaves of the plant can be determined. To measure the color values, use is made of an electronic color analyzer which is capable of measuring color and density shifts not visible or recognizable by visual inspection. Measured color values are corrected for spectral sensitivity of the film, angle of the sun, and film processing variations. These color values are then plotted on a chart and compared with an "ideal" color value for the specific crop and time during the season.

By correcting the color values to a standard, this method maintains consistency in the measurements from one period to the next, enabling the user to monitor the progress of growing conditions for an entire season. An indoor photographic standard is used to provide consistency in correcting the many variations that might occur in outdoor photographs.

The information obtained by this analysis can be used in a variety of ways, depending upon the crop involved. It can be used to determine the time, amount and pattern of fertilizer application or water application needed in the field. It also can be used to optimize the time of harvest, to compare different fertilizers and rates of application against one another, and to compare seed varieties in different fields. The analysis also allows one to compare nitrogen applications, moisture content and compaction of soil, as well as the progress rates of different fields. The accurate analysis allows the users to make quicker and better decisions about the needs of their crops. It will often pinpoint the start of a catastrophic circumstance which can be corrected at an early stage.

The process begins by periodically taking aerial photographs of the total field area. This is accomplished by conventional aerial photographic techniques, using a conventional camera. The film utilized is sensitive to both visible and infrared lightwaves. It is known as "false color transparency film", or "slide film". Because of the dominance of blue color values on such film, a filter is used to filter out the blue color values directed to the film. This is typically a No. 12 Wratten filter.

The transparency, when developed by conventional processing techniques, will have an image similar to that shown in FIG. 1. This particular photograph depicts a field 10 having a circular shape, although a rectangular or square field can be portrayed as well. Circular fields are common today in areas where circle irrigation equipment is used for irrigation purposes. In this image, the area within the circular perimeter 11 would be predominantly red in color, indicative of the infrared reflectance from a green growing crop. The border outside field 10, shown by the numeral 12, would be green in color, indicative of a dry area. The line shown at 13, which also would be green, is an access road. The irrigating equipment in the field is shown at 14. The patches shown at 15 are bare ground or windblown areas which do not support a growing crop, and also appear as green. The circular paths of the wheels for the irrigating equipment 14 are shown at 16 and are a variation of the red color, indicative of the stresses encountered by the growing plants due to the travel of the wheels over them.

It is to be noted that the bulk of image portraying the field area 10 for a growing green crop will be red. This color will predominate in evaluating any average colors. The visible red color, when projected onto a color analyser, can be broken into color values for red, blue and green. These values, when averaged for the entire field, provide the growing condition indicators desired according to this method.

After the transparency has been developed, it is placed within a conventional enlarger 17 and is projected onto the receiving plate 20 of a color averager 18. The color averager 18 is associated with a conventional electronic color analyser 21, which includes a probe 22 at the base of the color averager 18. The probe 22 is typically connected to the color analyzer 21 by means of a fiberoptic tube 23.

Electronic color analyzer 21 is conventional and is of the type used to analyze color values in photography. It has controls 24 through 27 which respectively analyze the full light spectrum, a selected red color spectrum, a selected blue color spectrum, and a selected green color spectrum. Standard "color correction units" as detected by the analyzer 21 are indicated on a dial 28. A control 30 is provided to allow the user to preset or "zero in" the total light reading detected by the analyzer 21.

Figure 3:
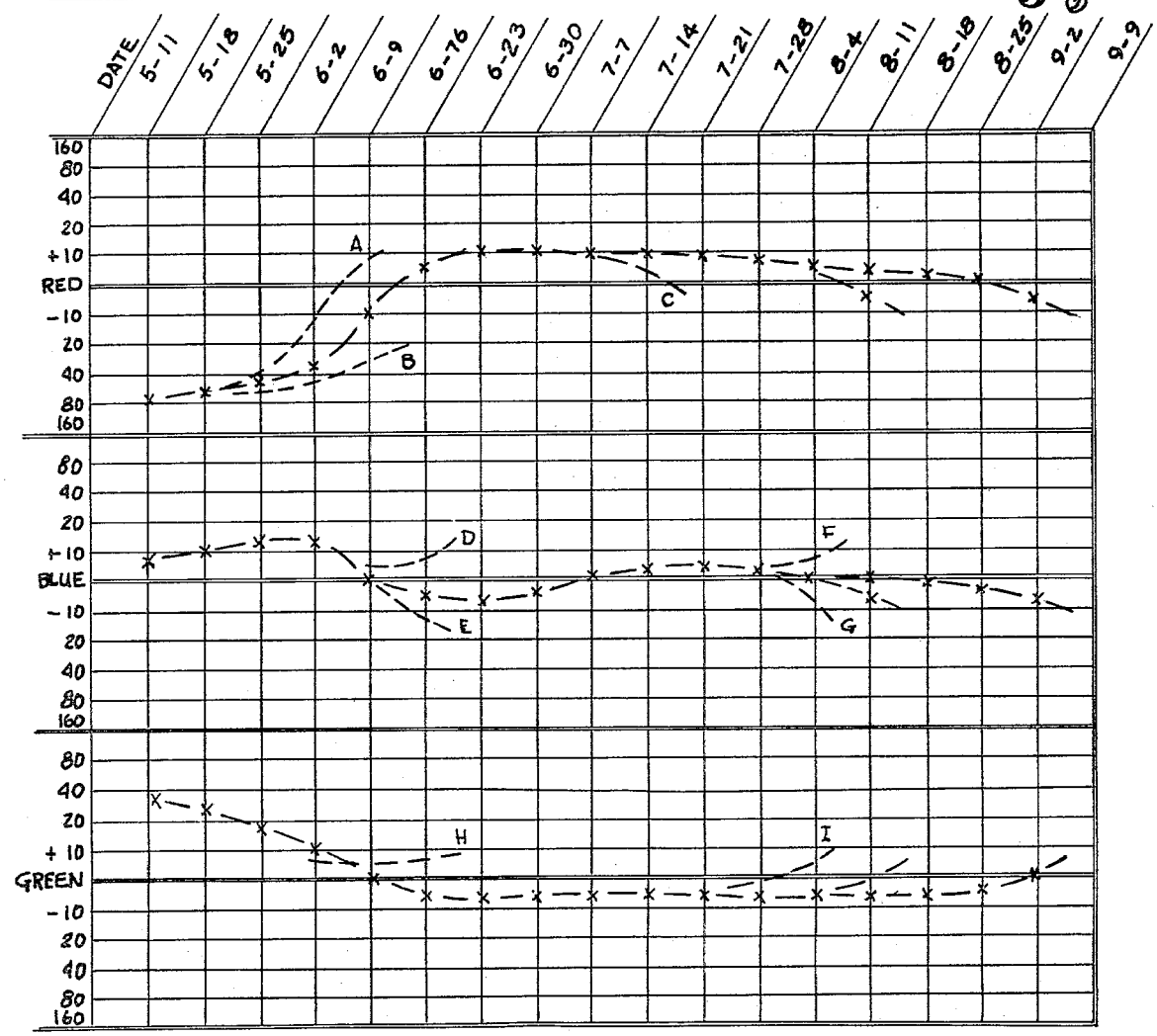
FIG. 3 is an illustrative chart of the color values plotted against an optimum set of curves.

With the analyzer 21 preset to zero by means of a master slide, as described below, the slide or transparency to be analyzed is then projected onto the plate 20 of the color averager 18 by means of enlarger 17. Without changing the total light setting on the analyzer 21, the aperture of the enlarger 17 is adjusted to obtain the zero reading. The enlarger aperture setting is then noted, along with the analyzer readings for each of the three colors taken in succession. The corrections described below are then algebraically added to the analyzer reading to arrive at a corrected color correction unit or color value to be plotted. These values are graphed as illustrated in FIG. 3 with the time of each photograph being arranged horizontally and the color values being arranged vertically.

To provide continuity for color analysis, a single color standard must be used. I make use of a red colored area on a wall, which can be photographed by using an electronic flash unit for lighting. A master slide of this color standard is taken, using the same film batch that will be used for the aerial photographs. These master slides are taken in a series by bracketing the exposures from two stops underexposed to two stops overexposed at one half stop intervals.

The standard slide taken at the manufacturer's recommended exposure is then used on the enlarger 17 at an arbitrary intermediate aperture setting to "zero in" the total light reading on the analyzer 21. As an example, I use an enlarger setting of f6.3 as the standard enlarger aperture reading. By comparing this setting with the aperture setting needed to attain a zero reading of the analyzer when projecting another slide, the exposures of the two slides can be emperically compared.

The master slides are also used to measure the spectral sensitivity color shifts in a film batch as detected by the color analyzer for the total range of exposures for the set of master slides. This is done by presetting the color analyzer 21 to the standard master slide, adjusting the enlarger aperture to "zero in" each of the other master slides at a range of exposure settings, and measuring the resulting differences in the analyzer reading for each color in comparison to those of the standard master slide. These are then charted for each film batch. An example of a chart showing the spectral corrections necessary for over/under exposures of a film batch are set out in Table 1 below.

TABLE 1

| Enlarger f-stop Settings | RED | GREEN | BLUE |
| --- | --- | --- | --- |
| 2 under | −22 cc | −5 cc | +28 cc |
| 1¾ under | −18 | −3 | +23 |
| 1½ | −15 | −2 | +18 |
| 1¼ | −13 | −1 | +15 |
| 1 under | −10 | 0 | +12 |
| ¾ | −8 | 0 | +9 |
| ½ | −5 | 0 | +6 |
| ¼ | −2 | 0 | +3 |
| Normal | 0 | 0 | 0 |
| ¼ over | +4 | −1 | −4 |
| ½ | +8 | −2 | −8 |
| ¾ | +11 | −3 | −10 |
| 1 over | +13 | −4 | −12 |
| 1¼ | +15 | −5 | −14 |
| 1½ | +18 | −6 | −16 |
| 1¾ | 21 | −7 | −18 |
| 2 over | +23 | −9 | −20 |

Empirical data can be used to determine the effect of cloud coverage and haze. Basically, this correction is directly related to the light deterioration of the total light due to cloud coverage. For instance, one half stop less light due to the presence of clouds when the aerial photograph is taken, as determined by a light meter, will result in a specific color shift. Namely, the photograph will have more red color values and less blue or green color values. Table 2 sets out correction factors relating to depletion of light from cloud cover in relation to normal film exposures at one one thousandth of a second and at a camera aperture setting of f5.6. The light deterioration due to cloud coverage is determined by the light meter built into the camera, or used in conjunction with it, and is measured in relation to the camera aperture setting.

TABLE 2

| f-stop | Blue | Red | Green |
|---|---|---|---|
| 1¼ (f 3.5) | +10 | | |
| 1 (f 4.0) | +8 | −8 | 0 |
| ¾ (f 4.0) | +4 | −4 | 0 |
| Normal | B | R | G |
| ½ (f 6.3) | −7 | +5 | 0 |

The Air Almanac or other available tables can be used to compute the height of the sun for the area in which the photographs are to be taken for each date and time of a photograph. This sun height can be converted empirically into a correction factor, which I apply only to the red color value reading. Empirical data can be used to check the development of these corrections. The lower the sun is to the horizon, the more red and less blue or green will appear in the resulting transparcney. Table 3 shows spectral corrections due to sun altitude for areas of Eastern Washington state, which are applied to the red analyzer readings.

TABLE 3

| Date | Time | 8 | 8 | 10 | 11 | 12 | 1 | 2 | 3 | 4 | 5 |
|---|---|---|---|---|---|---|---|---|---|---|---|
| Mar | | | | | | | | | | | |
| 1-10 | | −8 | −7 | −7 | 6 | 6 | 6 | 7 | 7 | 8 | 8 |
| 11-20 | | 7 | 7 | 6 | 6 | 5 | 6 | 6 | 7 | 7 | 8 |
| 21-30 | | 7 | 6 | 6 | 5 | 5 | 5 | 6 | 6 | 7 | 7 |
| Apr | | | | | | | | | | | |
| 1-10 | | 6 | 6 | 5 | 5 | 4 | 5 | 5 | 6 | 6 | 7 |
| 11-20 | | 6 | 5 | 5 | 4 | 3 | 4 | 5 | 5 | 6 | 6 |
| 21-31 | | 5 | 5 | 4 | 3 | 3 | 3 | 4 | 5 | 5 | 6 |
| May | | | | | | | | | | | |
| 1-10 | | 5 | 4 | 3 | 3 | 2 | 2 | 3 | 4 | 5 | 5 |
| 11-20 | | 4 | 3 | 3 | 2 | 1 | 1 | 2 | 3 | 4 | 5 |
| 21-30 | | 3 | 3 | 2 | 1 | 1 | 1 | 1 | 2 | 3 | 4 |
| Jun | | | | | | | | | | | |
| 1-10 | | 3 | 2 | 1 | 1 | 0 | 0 | 0 | 1 | 2 | 3 |
| 11-20 | | 2 | 2 | 1 | 0 | 0 | 0 | 0 | 0 | 1 | 2 |
| 21-30 | | 2 | 2 | 1 | 0 | 0 | 0 | 0 | 0 | 1 | 2 |
| Jul | | | | | | | | | | | |
| 1-10 | | 3 | 2 | 1 | 1 | 0 | 0 | 0 | 1 | 2 | 3 |
| 11-20 | | 3 | 3 | 2 | 1 | 1 | 1 | 1 | 1 | 2 | 3 |
| 21-30 | | 3 | 3 | 2 | 1 | 1 | 1 | 1 | 2 | 3 | 3 |
| Aug | | | | | | | | | | | |
| 1-10 | | 4 | 4 | 3 | 2 | 1 | 1 | 2 | 3 | 3 | 4 |
| 11-20 | | 5 | 4 | 4 | 3 | 2 | 2 | 3 | 4 | 5 | 5 |
| 21-30 | | 5 | 5 | 4 | 4 | 3 | 3 | 4 | 5 | 5 | 6 |
| Sept | | | | | | | | | | | |
| 1-10 | | 6 | 5 | 5 | 4 | 3 | 4 | 5 | 5 | 6 | 6 |
| 11-20 | | 6 | 6 | 5 | 5 | 4 | 5 | 6 | 6 | 6 | 7 |
| 21-30 | | 7 | 6 | 6 | 5 | 5 | 5 | 6 | 6 | 7 | 7 |

When using this process, the photographs of the fields are taken from an aircraft during daylight hours to measure the reflected infrared radiation from the growing crop. Manufacturers data should be used to attain an exposure that is as close as possible to an ideal exposure for the film. The fast shutter speed is necessary in aerial photography and the camera aperture must be varied as necessary for lighting conditions. The aircraft altitude should be adjusted so that the field area will fill as much of the film frame as practical. A zoom lens facilitates adjustment. When taking each photograph, the user should enter flight and camera data, note cloud coverage, and the date and time that the photograph was taken.

At the end of each film strip, or on another strip of the same batch, the user should take a flash exposure of the red color standard on the wall to produce a film strip standard frame for comparison to the standard master.

The exposed film, including the film strip standard frame, is then developed simultaneously according to the manufacturer's specifications. The enlarger 17 and analyzer 21 are then used to determine any differences between the film strip standard frame and the standard master frame for the film batch. Such differences relate to processing variations or film variations. This will be referred to as the "film/chemical/processing" correction.

It also might be necessary periodically to recalibrate the analyzer 21 using the master slide in order to accomodate shifts in the enlarger light color.

The "cloud cover" correction is determined from the flight log, which includes a record of the camera aperture settings for each photograph. These correction values are taken from table 2.

The over or under exposure of a particular transparency is determined when zeroing the analyzer 21 by varying the enlarger aperture. The necessary corrections, which will be termed the "spectral sensitivity" correction, is taken from Table 1.

The "date/time" correction for each transparency is taken from Table 3, and constitutes a negative number applied only to the red color correction values.

To arrive at the corrected color values for plotting purposes, one must algebraically add the color analyzer readings, the "date/time" correction, the "cloud cover" correction, the "spectro sensitivity" correction, and the "film/chemical/processing" correction. A sample of such readings and data is set out in Table 4.

TABLE 4

| | Date: 6-9 Time: 10:00 A.M. | | |
|---|---|---|---|
| Exposure Data | Red | Blue | Green |
| Analyzer Reading | +17 | +6 | −16 |
| Date/Time Corr. | −1 | — | — |
| Cloud Cover Corr. | +4 | −4 | 0 |
| Spectral Sens Corr. | −15 | −2 | +18 |
| Film/Chem/Proc. | +5 | +5 | +5 |
| Corrected Color | +10 | +5 | +7 |

The corrected color values, expressed in conventional color correction units, are plotted for each color on a graph, such as that shown in FIG. 3, with time being indicated in one direction and the unit measurements being indicated in the other. By viewing the resulting charts, one can make accurate comparisons between different fields of the same crop to spot growing conditions which can be altered to improve crop yield.

The resulting curves can be compared with curves from known crop yields in previous years to project current growing conditions that might not yet be readily visible by ground observation. Specific problems which can be dealt with by such analysis are sprinkler or water placement difficulties, initiation of disease factors, blights, insect infestations. This information is compared with inspection and agronometical testing data to make decisions for future crop action.

FIG. 3 illustrates optimum curves by the lines plotted with an X for a crop such as potatoes during the northern hemisphere growing season extending from May through September. Typical variations are indicated by the following letters:

A—The growing conditions shown by the red curve indicate a crop that is two weeks ahead of the normal schedule shown by the optimum curve. This might be caused by excessive moisture which will leach out fertilizer and cause other excessive moisture problems.

B—This curve shows slow development of the crop. It could be caused by wrong planting depth, poor fertilizer application, inferior seed quality, or lack of water. An investigation of the curves for the blue and green colors might give additional clues as to the cause.

C—This shows a decrease in foliage reflectance. The blue and green curves should be checked for other signs.

D—High nitrogen content in the field causes the leaves of the crop to turn a darker green color, which shows up as an increase in the blue values on infrared film. It does not vary the red curve.

E—Low nitrogen content in the field causes a lighter color leaf, which decreases the blue value on infrared film. Again, there is no corresponding change in the red color values.

F—Moisture stress or disease could also cause a darker leaf color, but this would be further indicated by a decreasing red value (shown at C) and an increasing green value curve (shown at I).

G—A decrease in the blue color values may be indicative of low nitrogen availability in the field, but also might be an indication of dying plants. If the plants are dying, this will be shown by a decreasing red color value curve and an increasing green color value curve.

H—Often the crossing or increase in the green color value curve will precede a decrease in the red color value curve (shown at C) or will be in conjunction with a decrease in the blue volor value curve (shown at E). An increase in the green color value curve sometimes leads the other indications by as much as two weeks, to provide better crop forcasting of problem areas, such as low nitrogen availability.

I—An increase in the green color value curve at this stage of crop growth, taken in conjunction with a prior decrease in the red color value curve (shown at C) and earlier increases in the green color value curve (shown at H) is indicative of dying plants. The exact cause must be verified by field inspection.

The above method utilizes available photographic techniques to determine the current growing condition of a crop during its growing season. It provides useful guidance to the grower and is particularly applicable to large scale farming practices where entire field analyses are advisable, such as in automated irrigated fields which normally have little manual observation during the growing season. One important aspect of this process is that it permits the user to view growing conditions of the entire field, rather than the condition of individual plants. The large scale averaging that is accomplished by projecting the photographic image of the entire field area onto the averaging attachment of the analyzer blocks out substantial anomalies in the field itself. The method attempts to average the green field condition. Sand blown areas or areas that have not germinated well should be overlooked and disregarded in conducting this analysis.

While a visual comparison of the plotted charts is presented in the accompanying drawings, it is to be understood that this step can be readily performed by electronic calculating and computing techniques. Such a comparison can be achieved through use of a properly programmed general purpose computer or by a computer specially designed for this purpose. The computer techniques involved will be readily available to those skilled in such technology.

Having described my invention, I claim:

1. A method of evaluating the current growing condition of an agricultural crop within a defined field area at a selected time during its growing season, comprising the following steps:

using infrared photographic techniques to photograph the field area from an aircraft under known daylight conditions;

producing a color photographic image representative of the infrared radiation emanated from the field area as photographed;

electronically integrating and measuring the average color density values contained in the photographic image over the total defined field area for a plurality of selected colors to arrive at a measured density value for each selected color;

and comparing the measured density value for each selected color to experientially derived density values for the respective colors representative of optimum conditions for the crop at a corresponding time during its growing season.

2. A method of evaluating the current growing conditions of an agricultural crop within a defined field area at a selected time during its growing season, comprising the following steps:

using infrared photographic techniques to photograph the field area from an aircraft under known daylight conditions;

producing a color photographic transparency including an image representative of the infrared radiation emanated from the total field area;

projecting the image of the defined field area as represented on the transparency onto a color analyzing apparatus for integration and measurement of the average color density values contained in the image over the total defined field area for a plurality of selected colors as represented on the transparency to arrive at a measured density value for each selected color;

recording the measured color density values separately for each selected color;

and comparing the recorded values for each selected color to experientially derived density values for each respective color representative of optimum conditions for the crop at a corresponding time during its growing season.

3. A method of evaluating the current growing condition of an agricultural crop within a defined field area, over a period of time during its growing season, comprising the following steps:

using infrared photographic techniques to photograph the field area from an aircraft at successive times during the growing season and under known daylight conditions to produce a sequence of photographs spanning the selected period of time during the growing season of the crop;

producing a series of color photographic images which are each representative of the infrared radiation emanated from the defined field area at each time it was photographed;

electronically integrating and measuring the average color density values contained in each photographic image over the total defined field area for a plurality of selected colors to arrive at a measured density value for each selected color at the time represented by the particular photographic image;

recording the measured color density values in relation to the time during the growing season at which each photographic image was taken;

comparing the recorded values for each selected color to experientially derived density values for each respective color representative of optimum conditions for the crop at a corresponding time during its growing season; and further comparing trends evidenced by changes in the recorded values for the selected colors in relation to changes evidenced in the experientially derived density values for each respective color during a corresponding period of time during the growing season for the crop.

4. The method as set out in claim 3 wherein the series of color photographic images are produced on transparencies, and wherein the step of electronically integrating and measuring the average color density values is accomplished by projecting the individual images of the total field area as represented on each transparency onto a color analyzing apparatus.

* * * * *